CAMERA SYSTEM FOR IMAGE MOTION COMPENSATION

Filed Jan. 2, 1951

FORE-TO-AFT SWING EXPOSURE

INVENTORS
JEAN WYLIE
WILLIAM E. OSBORNE
BY CLYDE R. AMSLER

H.W. Brelsford
Attorney

CAMERA SYSTEM FOR IMAGE MOTION COMPENSATION

Filed Jan. 2, 1951 9 Sheets-Sheet 2

VERTICAL ANGLE

INVENTORS
JEAN WYLIE
WILLIAM E. OSBORNE
BY CLYDE R. AMSLER
H. W. Brelsford
Attorney INVENTORS
JEAN WYLIE
WILLIAM E. OSBORNE
CLYDE R. AMSLER
BY H.W. Brelsford
Attorney INVENTORS
JEAN WYLIE
WILLIAM E. OSBORNE
BY CLYDE R. AMSLER
H. W. Brelsford
Attorney

CAMERA SYSTEM FOR IMAGE MOTION COMPENSATION

INVENTORS
JEAN WYLIE
WILLIAM E. OSBORNE
BY CLYDE R. AMSLER
H.W. Brelsford
Attorney INVENTORS
JEAN WYLIE
WILLIAM E. OSBORNE
BY CLYDE R. AMSLER
H.W. Brelsford
Attorney INVENTORS
JEAN WYLIE
WILLIAM E. OSBORNE
CLYDE R. AMSLER
BY H.W. Brelsford
Attorney INVENTORS
JEAN WYLIE
WILLIAM E. OSBORNE
CLYDE R. AMSLER
BY H.W. Brelsford
Attorney INVENTORS
JEAN WYLIE
WILLIAM E. OSBORNE
BY CLYDE R. AMSLER
H. W. Brelsford
Attorney

United States Patent Office 2,899,882

Patented Aug. 18, 1959

2,899,882

CAMERA SYSTEM FOR IMAGE MOTION COMPENSATION

Jean Wylie, Santa Monica, William E. Osborne, North Hollywood, and Clyde R. Amsler, Altadena, Calif., assignors to Hycon Manufacturing Company, a corporation of Delaware Application January 2, 1951, Serial No. 203,998

17 Claims. (Cl. 95—12.5)

This invention relates to cameras and has particular reference to a camera system that moves a camera to effect compensation for image motion.

While this invention is applicable to various photographic problems it will be described with respect to the photography of landscapes or other objectives of considerable area wherein the camera is mounted in a moving vehicle resulting in relative movement between the camera and the photographic objective. While the invention is applicable to vehicles of various types it will be described particularly with reference to aerial photography. The camera accordingly may be considered as being mounted in an airplane and this presentation will be limited to a consideration of the higher altitudes of flight of airplanes and to the higher airplane speeds. Accordingly it will be assumed that most photographs will be taken at an altitude in excess of 20,000 feet and at a ground speed in excess of 300 miles per hour. The principles of this invention, however, are applicable to other altitudes and to other vehicle speeds.

It is well known that the photographing of the earth's surface from a moving airplane gives rise to motion of the image of the earth's surface upon the photographic film. Various devices have been employed to attempt to reduce the resulting blur of the photographic image. For example, the photographic film has been mounted on a moving platen and the platen is given a velocity in the proper direction to reduce the relative movement of image over the sensitized film. Narrow slits at the focal plane have also been employed which move across the film and thus reduce the blur because of the minute exposure time for each portion of the film. Other attempts to meet this problem have included the use of very fast shutter speeds to reduce the effective exposure time, and the corresponding use of fast films of high sensitivity.

All of these expedients and devices however have proved to fall far short of the ultimate compensation desired. The present invention seeks to improve the amount of image motion compensation by rotating the camera bodily about one or more axes during the exposure period of the photographing action. While this invention may be combined with moving sensitized film and other image motion compensation expedients, it will be described with reference to a photographic film that is held stationary with respect to the camera in which it is mounted. Furthermore, this invention provides mechanism for moving this camera during the exposure period in an automatic fashion.

As will be pointed out hereinafter, the maximum amount of image motion compensation is obtained in accordance with the invention especially for oblique angle photography not only by swinging the camera so as to maintain the optical axis on a center point of the area being photographed but also by rotating the camera about its optical axis. In addition, especially for focal plane shutter cameras, a component of motion of the camera along a vertical line can be introduced to obtain the optimum compensation. The camera, therefore, must be moved about three mutually perpendicular axes during the exposure period and the angular movement about these axes must be carefully controlled. To obtain the maximum exposure time this movement of the camera may take place over periods as long as one second or more and the camera is in continuous movement during this time.

The invention includes the use of gyroscopes having three-fold purpose. First, the gyroscopes act in a well known manner to gyrostabilize the camera in space to make the camera independent of gyrations of the airplane in which it is mounted. Second, control moments may be applied to the gyros to maintain the camera in any pre-selected position with respect to the airplane regardless of the time of travel of the airplane and regardless of the distance over the earth's surface that the airplane moves. Third, the gyros, especially in accordance with the present invention, are mounted thru single gimbals on the camera supporting frame and motors are connected to the gyros to force precession of the gyros along selected directions so that the resultant reactive gyroscopic moments are applied directly to the camera to cause it to move about the three axes.

It is therefore a general object of the invention to provide image motion compensation by bodily movement of the camera during the exposure time period.

It is another general object of the invention to provide automatic mechanism for effecting movement of a camera during exposure for compensating for image motion.

Another general object of the invention is to provide a dynamic gyroscope system wherein the reactive moments generated by forcing the precession of the gyros effect bodily movement of the camera.

Another object of the invention is to provide a two ring gimbal mount for cameras in which movement is effected simultaneously during the exposure period about the three mutually perpendicular axes of the gimbal mount.

Another object is to provide a camera mount for oblique photography wherein the camera may be swung along a line parallel to the direction of movement of the vehicle in which it is mounted and may simultaneously be rotated about the optical axis.

Another object of the invention is to provide image motion compensation for oblique angle photography for focal plane shutter cameras wherein the camera is bodily moved about three mutually perpendicular axes.

A further object is to provide a system for orthagonal types of camera mounts wherein the camera is stabilized with respect to the vehicle carrying it by gyroscopes which may be automatically and continuously changed in orientation, especially for the purpose of compensating for precession due to time elapse and movement of the camera carrying vehicle over the earth's surface.

Another object is to provide an automatic system responsive to the control of several variables for determining and applying the proper drive forces to force the precession of gyros to obtain bodily movement of a camera for image motion compensation.

Another object is to provide an automatic system for image motion compensation that forces the precession of gyros to bodily move a camera, and which restores the gyros to the starting position upon completion of the exposure.

Still another object is to provide an automatic camera operating and image motion compensation system that may be operated continuously without the attendance of a human operator.

Other objects and advantages of the invention will be apparent in the following description and claims considered together with the accompanying drawings forming an integral part of this specification and in which:

*Optical geometry*

Figures 1, 2, 2A:
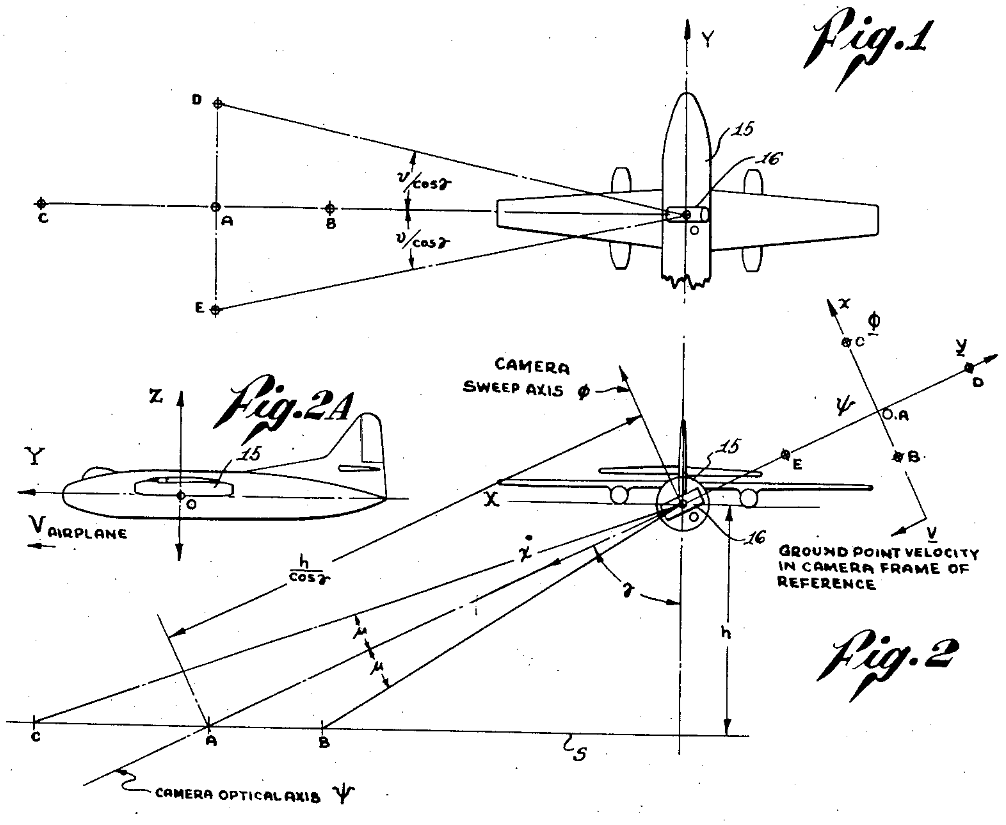
Fig. 1 is a plan view of an airplane carrying a camera and photographing an area of the earth's surface.
Fig. 2 is an elevation view of the airplane of Fig. 1 as viewed from the rear of the airplane.
Fig. 2A is a side view of the airplane of Figs. 1 and 2 illustrating the axes designations.

Illustrated in Figs. 1 and 2 is the geometry with respect to oblique angle photography. An airplane 15 is assumed to be flying along a Y axis, with the right angle vertical axis through the airplane being designated as the Z axis (Fig. 2A), and the axis parallel to the horizon or through wings of the airplane being designated as the X axis. A camera 16 may be mounted in the airplane with its optical axis generally transverse to the direction of flight or the Y axis and this camera optical axis may be designated by the Greek letter psi. The airplane will be flying above the surface S by an altitude or height *h*. The velocity of the airplane is a vector and may be designated by V.

Figure 3:
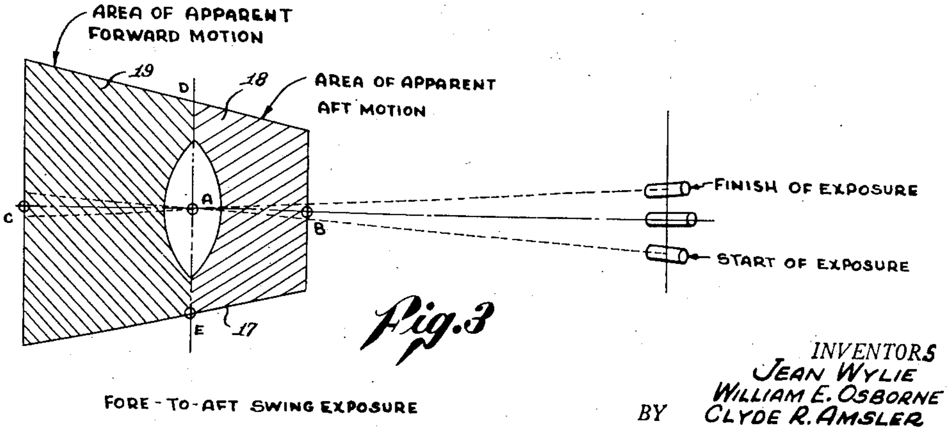
Fig. 3 is a plan view corresponding to Fig. 1 but illustrating the type of blur introduced by swinging the camera so as to maintain its optical axis centered on a mid-point of the photographic object.

Illustrated in Figs. 1, 2 and 3 is an area of the earth's surface being photographed wherein the optical axis psi is centered on the object A. The cone of the field of view of the camera defines a generally trapezoidal area 17 as illustrated most clearly in Fig. 3, assuming of course that only a rectangular cross section of the cone of view is employed as is customary on the ordinary photographic plate. Thus, outer points on a cross axis through A may be designated as B, C, D and E.

When the airplane 15 is moving along its Y axis with a velocity V and the camera 16 is rigidly attached to the fuselage in the position illustrated, the entire objective scene 17 will be displaced with respect to the airplane during an exposure period. This displacement when viewed by a camera results in motion of the image across the image plane of the camera during the exposure period. It is this image motion that the present invention seeks to reduce by a suitable movement of the camera bodily on its mount in the airplane and with respect to the airplane.

The camera axis psi may be centered on the object A and the camera may be swung during the exposure period so as to maintain the optical axis on the object A. Thus there will be no movement of the object A on the image plane of the camera and this will result in a clear, unblurred photographic impression of the object A on the sensitized film.

By an inspection of Fig. 3 however, it will be apparent that while the object A remains stationary on the image plane the object B will move in one direction on the image plane and the object C will move in the opposite direction while this swinging action from fore to aft takes place. The general areas of apparent aft and forward motion on the image plane may be designated by the numerals 18 and 19 respectively.

The present invention particularly provides a solution for this problem of relative image movements of the different parts of the scene when the camera is swung in oblique angle photography. This is accomplished in accordance with the invention by rotating the camera about its optical axis.

The amount of rotation about the optical axis may be approximately determined by maintained a fixed line in the cone of view of the camera on the object B and rotating the camera so that the same line will tend to maintain itself on B. Alternatively the upper line of the cone could be maintained on the object C to obtain approximately the same result. To an observer standing at the image plane end of the camera and looking toward the objective this rotating motion will be in a clockwise direction.

Certain types of focal plane shutters when used with long exposures may give rise to a shearing action image motion, and in order to reduce this, a tilting action may be employed. Accordingly, the present invention also introduces a rotation about an axis generally parallel to the line of flight of the airplane so that the outer end of the camera is lifted to counteract this shearing of the image in certain focal plane shutter cameras. This axis, while it may roughly coincide with the flight axis Y is best designated by a separate reference and for this purpose the Greek letter gamma may be employed.

Figure 4:
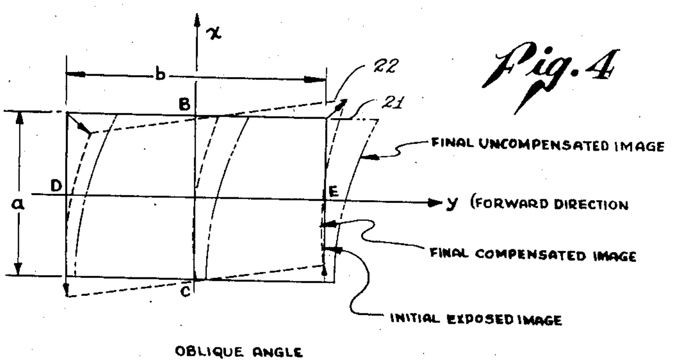
Fig. 4 is a diagram of an exposed photographic plate showing the type of error introduced by image motion for oblique angle photography in a focal plane shutter type of camera and the compensation thereof effected by the present invention.

Illustrated in Fig. 4 on a greatly exaggerated scale is a diagram of the image motion both compensated and uncompensated for oblique angle photography as illustrated in Figs. 1 through 3. The view of Fig. 4 is that which would be obtained on a ground glass placed in the image plane of the camera. There it will be noted that the view is inverted as is customary in optical equipment with the closest point in the field, B, appearing on the top and right hand object D appearing at the left. In the uncompensated image 21 shown by long dashes interspersed with two short dashes the image motion of a camera fixed to the airplane during exposure is illustrated. There it will be noted that the closest part of the foreground makes the greatest amount of shift and consequently would cause that part of the final photographic picture to be the most blurred.

The compensated image obtained by following the present invention is shown by dash lines and may be designated 22. It will be noted that this image is much less displaced from the original exposure frame and hence there will be less blur in the final picture. The final compensated image is angled with respect to the initial image due to the combined effects of rotation about the optical axis and rotation about the gamma or flight direction axis.

Figure 6:
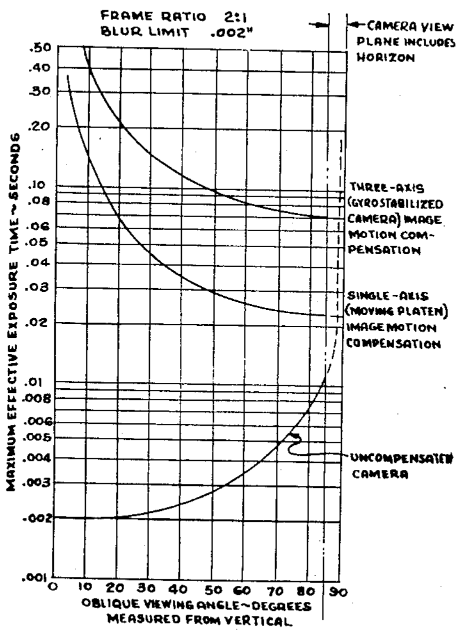
Fig. 6 is a graph of the improvement which may be effected for oblique angle photography by employment of the present invention.

The improvement in image resolution is illustrated graphically in Fig. 6 wherein a completely uncompensated exposure is compared to an exposure wherein the camera is swung from fore to aft only. These two curves are compared in turn with the top curve showing the improvement resulting from the complete utilization of the present invention in oblique angle photography. These curves may be derived and proven mathematically.

Figure 5:
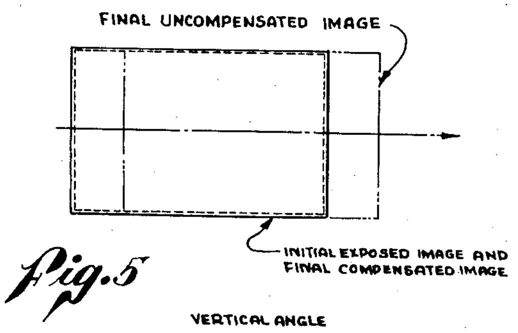
Fig. 5 is a diagram of an exposed photographic plate wherein the camera is pointed vertically downwardly showing the error introduced by image motion and the compensation thereof in accordance with the invention.

The image motion for a camera that is taking a view vertically downwardly, is illustrated in Fig. 5. There it will be apparent that the shift is in one direction only and is uniform due to the symmetry of the scene geometry with reference to the optical geometry. The present invention may be applied to this vertical photograph to swing the camera accurately to maintain the scene unmoved on the image plane at all times over all parts of the image. When sidewise drift of the airplane occurs, this swinging may take place about several axes simultaneously.

*Schematic structure and circuit*

Figure 7:
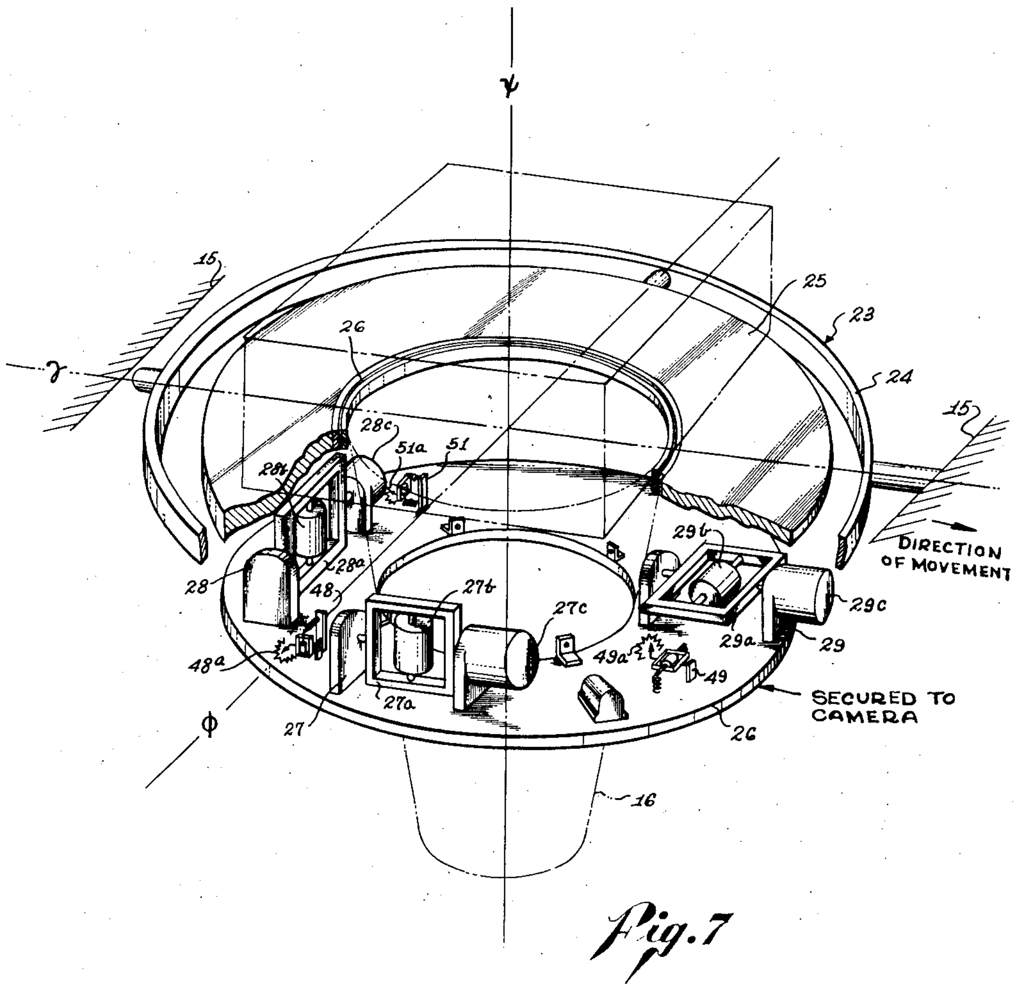
Fig. 7 is a perspective view with portions broken away of a schematic type of mechanical apparatus embodying and illustrating the invention.

Illustrated in Fig. 7 is a simplified diagrammatic mechanical structure embodying the essential mechanical parts and movements employed in a preferred form of the invention. The camera 16 is illustrated in broken or shadowed outline. This camera is held in a mount so that it can move on three mutually perpendicular axes. While the camera is illustrated as being in a position for vertical photography, this is for illustrative purposes only and it will be appreciated that it can be rotated to any oblique angle on either side of the airframe in which it is mounted. The mount may be designated generally by the numeral 23 and may include an outer gimbal 24 pivoted to the airframe 15 along an axis generally parallel to the direction of flight which rotational axis has been designated the gamma axis. An inner gimbal 25 is pivoted to the outer gimbal 24 at right angles to the gamma axis to form the usual gimbals mount. This axis may be designated as the phi axis and may be referred to as the swing axis of the camera. This is in contrast to the gamma axis which may be referred to as the roll axis and the axis for determining the angle of obliquity for oblique angle photography. The camera 16 may be mounted in an anti-friction bearing arrangement 26 for rotation about its optical axis, psi.

Generally speaking the angle of movement for any one exposure of the camera is dependent upon the altitude and the velocity of the airplane. The lower the altitude and the higher the velocity and the longer the exposure period, the greater must be the angular movements for one exposure. For example, with a one-second exposure time in vertical photography at an altitude of 10,000 feet with a camera of 40 inches focal length, an image motion of 10 inches per second will be obtained which will require an angle of swing of about 6 degrees. For most ordinary photography however, the oblique angles with altitudes above 20,000 feet and plane velocities above 300 m.p.h. and exposure times of about 1/10 of a second the maximum angular movement about any axis would be about 1½ degrees.

The mechanism for movement of the camera on its mount is provided particularly in accordance with the invention by employing the reaction moments set up by forcing the precession of gyroscopes. The term gyroscope will hereinafter be referred to by its engineering name of gyro. For purposes of illustration a separate gyro is provided for each angular movement although this gyro arrangement can be modified as will be mentioned subsequently. Thus a gyro platform 26 may be mechanically secured to the camera 16 and may support a phi axis gyro 27, a gamma axis gyro 28 and a psi axis gyro 29 and each will force rotation of the camera about its associated axis. Each gyro may include supports upon which a gimbal **27*a*, 28*a*, and 29*a* may be rotated and upon which is mounted at right angles a gyro rotor 27*b*, 28*b* and 29*b*, including the gyro drive. Each gyro may also include a forcing motor 27*c*, 28*c* and 29*c* for forcing the precession of the associated gyro gimbal. Thus, the forcing motor 27*c*** may be operated to swing the camera on the phi axis and the resulting angular velocity will be dependent upon the amount of force applied by the forcing motor.

Figure 8:
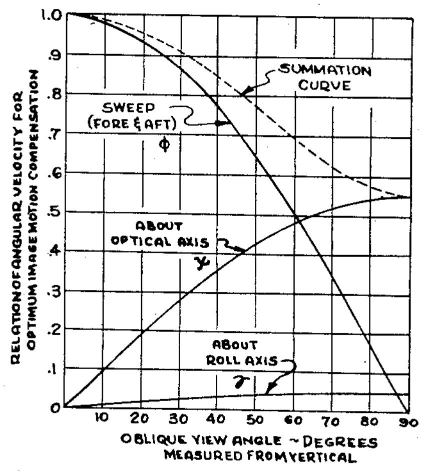
Fig. 8 is a graph of the ratio of angular motion about each of the three axes according to the oblique angle of photography.

Illustrated in Fig. 8 is a graph of the relation or ratio of angular velocities about the three different axes for affecting the desired image motion compensation for a particular type of camera. These curves represent ratio of angular velocity only, inasmuch as for any particular oblique angle the absolute angular velocity will be dependent upon the ratio $V/h$. Thus, the velocity of the airplane and its altitude above the ground are prime factors in determining the absolute angular velocity.

Figure 9:
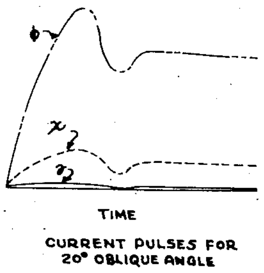
Fig. 9 is a diagram of an illustrative electrical current pulse used for driving the camera during an exposure period for an oblique angle of 20 degrees.
Figure 11:
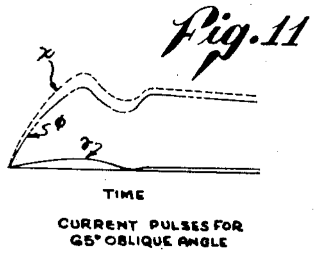
Fig. 11 illustrates the current pulses for a 65 degree oblique angle.
Figure 10:
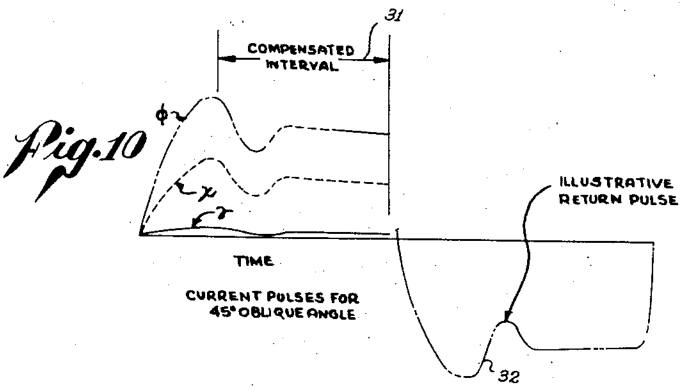
Fig. 10 is similar to Fig. 9 but showing the current pulses for 45 degrees oblique angle.

Illustrated in Figs. 9, 10 and 11 are illustrative current pulses which must be supplied to each of the forcing motors **27*c*, 28*c* and 29*c*. These forcing motors are preferably electric but could be hydraulic motors, pneumatic motors, mechanical motors or other types of mechanism. Assuming however that they are electrical, a pulse of current, either A.C. or D.C., may be supplied to them in accordance with the requirements of Fig. 8. Thus, in Fig. 9 which illustrates the relation at 20 degrees oblique angle the current to the phi axis motor will be the greatest, since the swing movement will be the predominant movement. The current to the psi motor 29*c*** will be much less since rotation is a minor movement at that oblique angle. The up and down swing of the camera about the gamma axis will be very minute in relation to the other two. The zero degree starting position indicates a camera pointing vertically downwardly, and the 90 degree position indicates a camera pointing horizontally outwardly.

The condition prevailing at 45 degrees is illustrated in Fig. 10 wherein the phi motor pulse is still the greatest but the psi motor pulse is substantial compared to it. It will be appreciated however that the bulk of the current must be employed in creating a moment that will accelerate the mass being rotated to the desired angular velocity, since during exposure it is preferred that all of the angular velocities remain substantially uniform. Thus, the camera cannot be exposed until the peak of the current is reached and thereafter a continuous amount of energy will be required to maintain the angular velocity thus established. Camera motion ceases when the energy flow to the precession forcing motors stops. The time period available for exposure is designated by the dimension 31 in Fig. 10 and is designated as the compensated interval. This interval will ordinarily be greater than is utilized since it covers the most extremely unfavorable condition of photography such as slow films, poor lighting and the physical factors that lead to large amounts of image motion.

Once the photographic exposure cycle has been completed the camera must be returned to its original position so that it will be ready for new exposure and while any type of return angular speed may be employed the driving pulse could merely be inverted as one possible way of obtaining this return movement. This is shown graphically by the curve 32 in Fig. 10.

The conditions prevailing at an oblique angle of 65 degrees are illustrated in Fig. 11.

Figure 12:
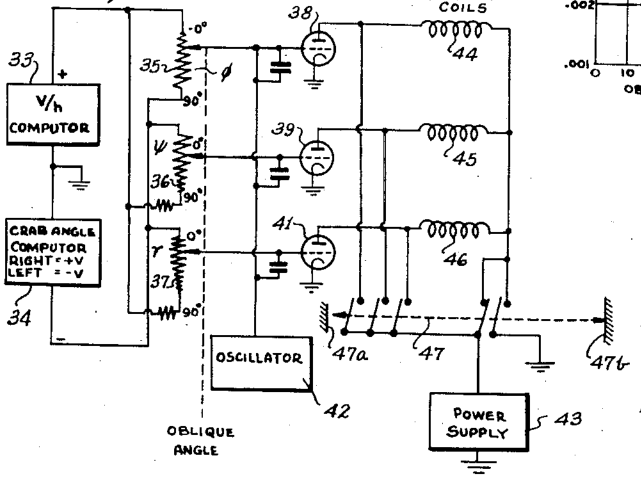
Fig. 12 is a simplified schematic circuit illustrating the principal factors in the control of current to the forcing motors of Fig. 7.

Illustrated in Fig. 12 is a schematic circuit for effecting forcing of the control gyros 27, 28 and 29 of Fig. 7 to cause the camera to swing thru its exposure cycle. The circuit may also return the camera to its starting point so that it will be in readiness for a new exposure.

A V/$h$ computer 33 and a crab angle computer 34 may be connected in series so that the algebraic sum of their output may be used as a starting potential. Both computers are commercially available and are used on aircraft. The output of each is an electrical current or potential and may be either A.C. or D.C. The crab angle input is necessary because of lateral motion of the airplane due to either winds or maneuvering.

This source voltage may be divided by shaped potentiometers 35, 36 and 37 with a take off movable in response to the oblique angle setting of the camera in the airplane. The potentiometers are designed to follow the ratio curves of Fig. 8. These potentiometers may be used to set the bias level of individual vacuum tubes 38, 39 and 41 and thus set the level of response of these tubes. An oscillator 42 may feed a signal of any desired wave form, for example that of Figs. 9, 10 and 11, to each tube. A power supply 43 may be connected thru forcing coils 44, 45 and 46 to the plates of the tubes. These forcing coils may be located within the forcing motors 27c, 28c and 29c of Fig. 7.

The oscillator 42 may initiate the exposure rotation causing currents of varying strength to flow thru the coils 44, 45 and 46. A double throw limit switch 47 may connect the power supply 43 and the forcing coils, and for the exposure movement the switch will be in the position illustrated. When the end of the exposure movement is obtained a stop 47a will throw the switch in the opposite direction, causing D.C. from the power supply to pass thru the coils in the reverse direction. This restoring movement will occur until the starting position is reached at which time a stop 47b will throw the switch to the position illustrated. Thus, the circuit of Fig. 12 shows the major components of actuation in response to the oblique angle of the camera and the V/$h$ factor as combined with the airplane rate of turn. The current thru the forcing coils will be made to follow the lines of Fig. 8 for the associated axis and the movement will be stopped upon reaching the mechanical limit 47a. Ideally, each coil should have its own limit stop 47b so that the exact rest position about each axis should be obtained. This is not illustrated in Fig. 12, however, as this circuit is diagrammatic only for indicating the principal requirements and functions of the control circuit.

The movement of the gyros of Fig. 7 has been described with reference to a dependent pulse of current such as those illustrated in Figs. 9, 10 and 11. However, the driving current in the forcing motors may be carefully regulated and continuously regulated throughout the entire exposure movement of the camera by employing devices which are sensitive to the angular velocity. Thus, the gyro platform 26 of Fig. 7 may also include rate gyros associated with each of the driving gyros. These rate gyros are small gyros aligned with the associated forcing gyro but the movement of the gyro gimbal is restrained by springs and the rotation of the gyro gimbal drives a potentiometer. Thus the psi gyro 29 may have a rate gyro 49 associated therewith resulting in a sweep of a potentiometer 49a. The phi angle gyro 27 may have a rate gyro 48 connected therewith driving a potentiometer 48a. Similarly the gamma axis gyro 28 may have a rate gyro 51 driving a potentiometer 51a. As the camera moves through an angle about any axis the rate gyro associated with that angular movement will assume a position dependent upon the angular velocity or acceleration as counteracted by the springs of the rate gyro. Thus, for a constant angular velocity, the rate gyro will maintain a fixed angular disposition resulting in a fixed potentiometer setting for the rate gyro. This potentiometer setting accordingly may be used as a control device in a driving circuit for regulating the precise amount of current supplied to the forcing coils. The use of the rate gyros will be described in connection with the circuits of Figs. 17, 18 and 19.

Alternatively it is possible to measure angular velocity by measuring the amount of current used in the gyro forcing motor to maintain the gyro in a neutral position.

*Mechanical structure of the system*

Figures 13, 14, 15, 16:
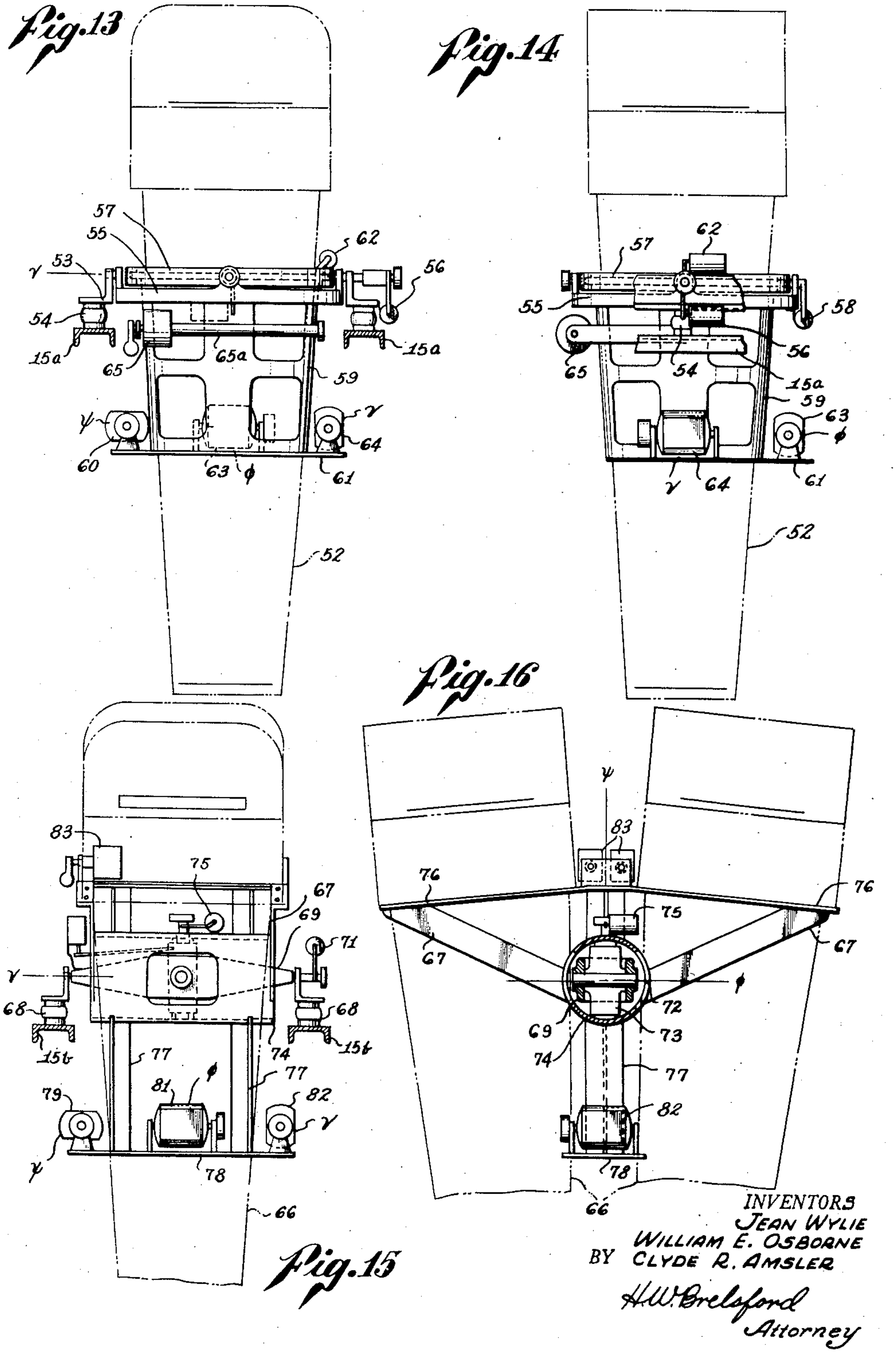
Fig. 13 is an elevation view of a more practical type of camera mount embodying the invention.
Fig. 14 is a side view of the camera of Fig. 13.
Fig. 15 is a side elevation view of a twin mount embodying the invention for receiving two cameras.
Fig. 16 is a view at right angles to Fig. 15 and along the axis of the fuselage of an airplane of the camera mount of Fig. 15.

Illustrated in Figs. 13 and 14 are camera mounts embodying the invention and illustrating a mount structure which is more nearly in accordance with engineering practice than the schematic structure of Fig. 7. A camera 52 having a straight optical path may be disposed in a mount 53. The camera is illustrated as in position for vertical photography but it will be appreciated that the camera can be rotated through any angle to obtain oblique photography. The camera may be supported by the airplane structure 15a through absorbing shock mounts 54 which tend to insulate the camera mount from airframe vibration. An outer link gimbal 55 may be pivoted to the shock mount structure and the axis of rotation of the gimbal will be the gamma axis. Vibration or high frequency oscillation about this axis may be damped by a damper 56 the structure of which is well known and which generally may have an increased rate of damping for higher frequencies. An inner gimbal 57 may be mounted on the outer gimbal 55 and may be damped by a damper 58. Pivotally mounted within the inner gimbal 57 may be a rotatable camera bracket 59 having a lower gyro shelf 61. The rotation of this bracket may be damped by a hydraulic damper 62.

The gyroscopes for forcing precession about the various axes may be mounted on this shelf and include gyros 60, 63 and 64 for the psi, phi and gamma axes respectively. A weight 65 may be slidable on a rod 65a to counterbalance for shifting of weight of film supply in the camera magazine due to unspooling the film from one reel onto another. Equivalent weight compensating devices may be used to compensate for other weight shifts within a particular camera and, for example, compartmented containers partly filled with oil may be used to counterbalance the mount to give a desired location to the center of gravity when cameras of different types are interchangeably used on the same camera mount. The rate gyros employed in the control circuit are not illustrated in Figs. 13 and 14.

Illustrated in Figs. 15 and 16 is a twin camera mount which may be used when a wider area of the terrain must be photographed. A pair of cameras 66 are shown in phantom outline as supported by a camera mount 67. The mount may be supported by an airframe 15b and thus the gamma axis will extend between two vibration insulating mounts 68. A support spindle 69 may extend between the mounts 68 and its vibration may be damped by a damper 71. A transverse pin 72 may extend across a central aperture in the spindle 69 to support a cruciform member 73 for rotation about the pin to thus define movement about the phi axis. The cruciform 73 may have a tubular outer housing 74 pivoted thereto having its motion damped by a damper 75. Motion of the tube on the cruciform 73 defines the psi axis of the mount which will be between diverging optical axes. A suitable damper may be employed for motion about the phi axis.

Mounted on the outer tube 74 may be a double camera support bracket 76 which may have a downwardly depending member 77 which supports a gyro shelf 78. Gyroscopes 79, 81 and 82 with their associated forcing motors may be mounted on the shelf for the generation of moments to effect rotation of the camera about the psi, phi and gamma axes respectively. Suitable weight compensators 83 may be included in the mount also.

In effect the construction of the freely movable mount of Figs. 15 and 16 is a mechanic's universal joint. The construction is very compact and therefore light in weight and small in bulk.

*Control circuits*

Figure 19:
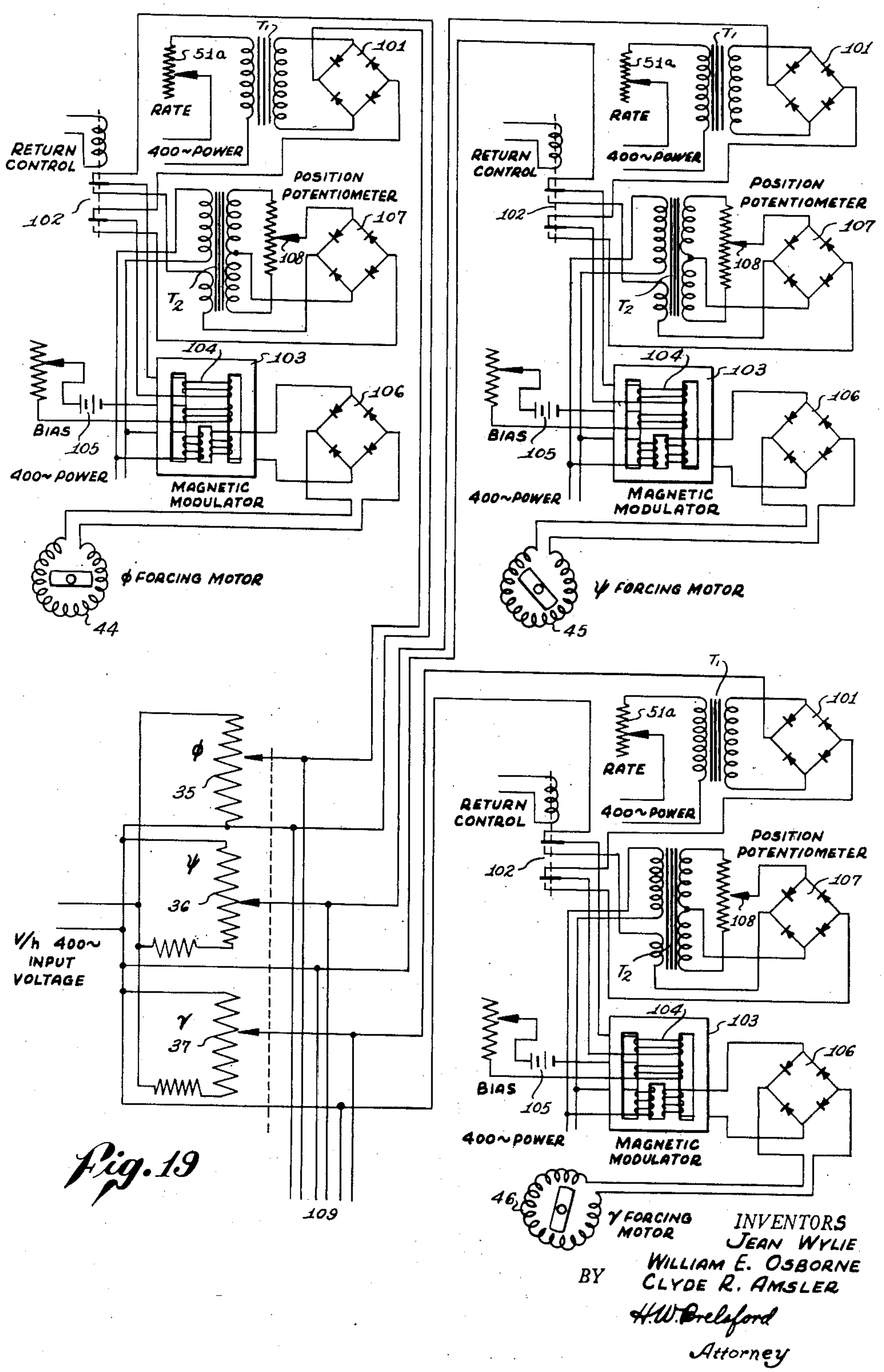
Fig. 19 is a diagram of a non-electronic electrical control circuit for effecting the necessary control.

Illustrated in Fig. 19 is a non-electronic circuit for operating the precessing motors. The V/*h* output may be fed into an oblique angle potentiometer as in Fig. 12 except that in this case the V/*h* output may be A.C., for example, at 400 cycles which is presently employed on some aircraft. In the case of the phi forcing motor 44, the output from the potentiometer 35 may be passed to a phase generating rectifier network 101 where it is opposed by an A.C. delivered from a transformer T1 which is energized by a connection from the airplane supply of 400 cycles but regulated in voltage by the rate potentiometer 49*a*. This rate potentiometer indicates in effect any change from uniform angular velocity.

The rectified output from 101 passes thru a return switch 102 to a control coil 104 of a magnetic modulator or saturable core transformer 103. The transformer is biased close to the saturation point by a bias battery 105 so that a small current in coil 104 may completely control the transformer. The control current either increases or decreases the saturation to give greater or lesser amounts of transformer output to a rectifier network 106. The rectifier 106 delivers greater or lesser amounts of current to the forcing motor 44 depending upon the current in the control coil 104.

The circuit of Fig. 19 gives rise to a reversible current which gives complete bi-directional control in regulating the rate of angular velocity.

The reverse direction of current in the forcing coil 44 may be used to return the camera to its starting position. At the end of the exposure the switch 102 is actuated to disconnect the control coil 104 from 101 and connect it to a phase responsive rectifier network 107. This network is connected to the output of a center tapped transformer T2 having a position potentiometer 108 across its output. The actuation of switch 102 therefore applies a reversing current in forcing coil 44. The reverse action ceases when the potentiometer 108 causes a null current from the transformer T2.

The potentiometer 108 reflects the home position of the gyro whose precessing is being forced, and the gyro is considered to be home when the potentiometer take off is at the center point of its resistor.

While the control of only one torque motor has been described it will be obvious that the other torque motors can be controlled in the same fashion. Thus, similar branch circuits are provided for the forcing coils 45 and 46.

Also additional input data may be utilized by the control system by suitable leads such as the leads 109 connected to the conductors from the oblique angle potentiometers.

Figure 17:
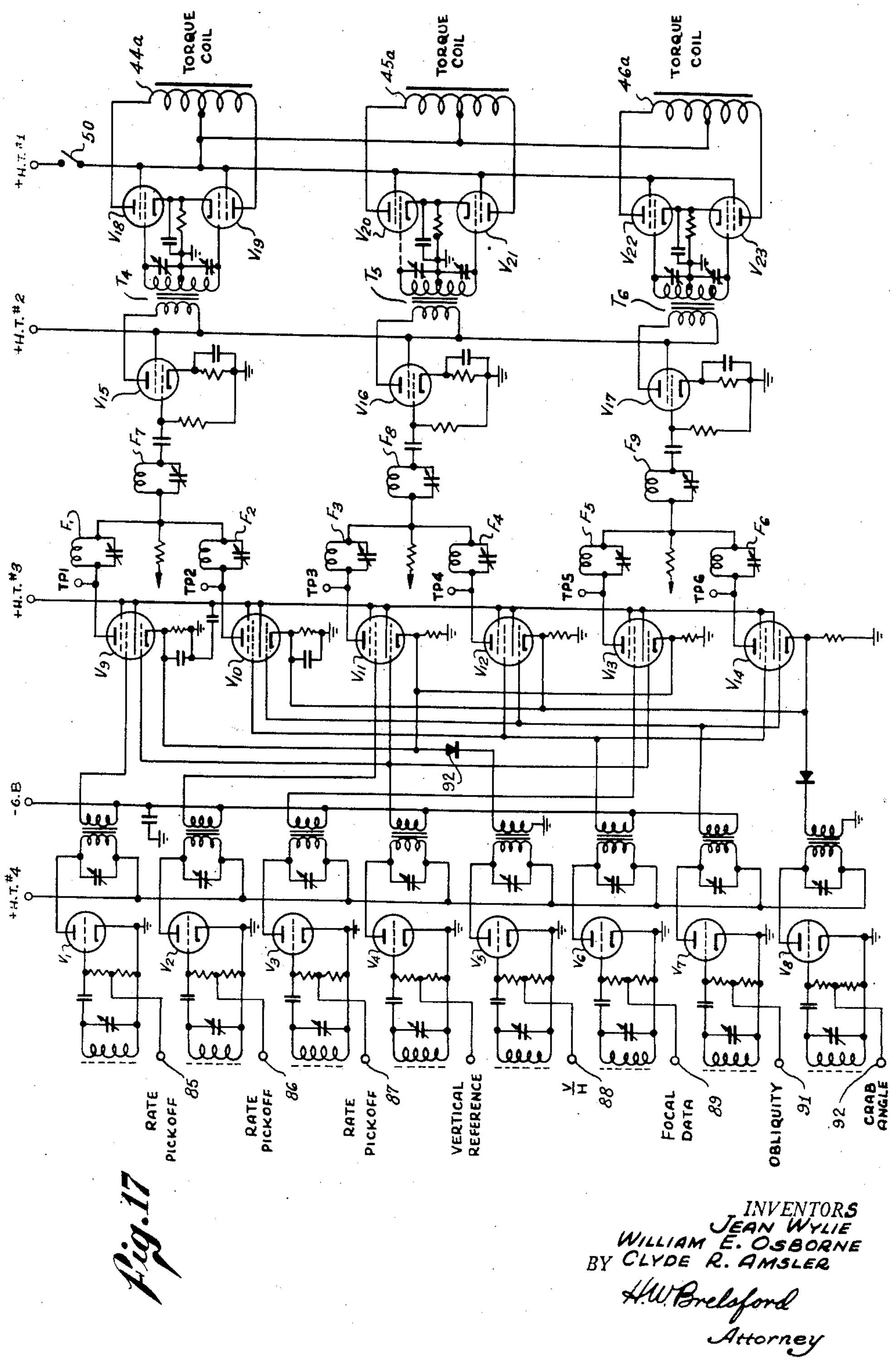
Fig. 17 is a diagram of an electronic control circuit for effecting the driving motion in accordance with a major portion of the variables.

Illustrated in Fig. 17 is an electronic circuit for driving forcing coils 44*a*, 45*a* and 46*a* connected with the phi, psi and gamma axes gyros of any of the mechanical structures illustrated. A control potential from the rate gyros 49, 48 and 51 of Fig. 7 may be fed into the circuit in terminals 85, 86 and 87. V/*h* data may be fed in at a terminal 88, focal data (for different cameras used on the same mount) may be fed in at terminal 89, the oblique angle data may be fed in at terminal 91 and the angle of crabbing may be fed in at terminal 92. These input data may be in the form of a D.C. potential. Vacuum tubes V1 through V8 are provided, each of which acts as the control valve for eight separate oscillators. Each oscillator has a tuned circuit between grid and cathode and the potential supplied at the various input terminals will vary the frequency of oscillation. The oscillator for V4 remains at a constant frequency and is used as a reference frequency.

The combining of the variable data is done in the circuit by the principle of mixing frequencies in a series of mixing tubes V9 thru V14 respectively. The mixing results in a sum and difference frequency which individually identify the ratio of the input data. Two mixing tubes are associated with each torque coil or forcing coil. In the case of the V/*h* input data however, the output of its tube, V5, is rectified by a rectifier 92 to obtain a D.C. current which is applied to the cathode of one of each pair of mixing tubes for each of the torque coils.

The output of each oscillator of V1 through V8 is delivered to a broad band tuned circuit so that a transformer connection may be established from each of the oscillators except V5 to one or more of the mixing tubes V9 through V14. All of the data input accordingly, other than V/h, appears as a discrete frequency. At the plate of each mixer tube appear three components; the sum and the difference frequencies plus an amplitude variation of both created by the varying negative V/*h* signal applied to the cathodes. Tuned series filters F1 through F6 are provided in each plate circuit for independent acceptance or regulation of the frequencies.

One filter of each pair will pass the sum frequency and the other will pass the difference frequency. At this point the signals may be taken from each mixer tube at test points TP1 through TP6 for separate amplification and additional filtering before final application as a control signal. Broad band filters F7 through F9 are provided for each pair of mixing tubes and will accept all frequencies extending to the limit of the anticipated sum and difference frequencies. These filters exclude undesired frequencies.

The output of these broad band filters is fed into amplifier tubes V15 through V17. This amplifier output is fed by transformers T4, T5 and T6 into push-pull pairs of tubes V18 thru V23 having their plates connected to opposite ends of the torque coil 44*a*, 45*a* and 46*a*. The secondaries of transformers T4, T5 and T6 are center-tapped and each part is formed into a tuned circuit, one to pass the sum frequency and the other to pass the difference frequency. Thus, whichever current is predominant in the mixer pairs will prevail in the push-pull circuit and this will cause the push-pull tubes to operate at a high level causing a high current to flow in one half of the coil.

The forcing coils accordingly are double acting to give precise instantaneous control at all times. Also by opening a switch in one branch of the mixing circuit the coil can reverse the motor. If the torque coil is selectively wound it would be even more responsive, but as a general rule will operate on a combination of both amplitude and frequency.

Figure 18:
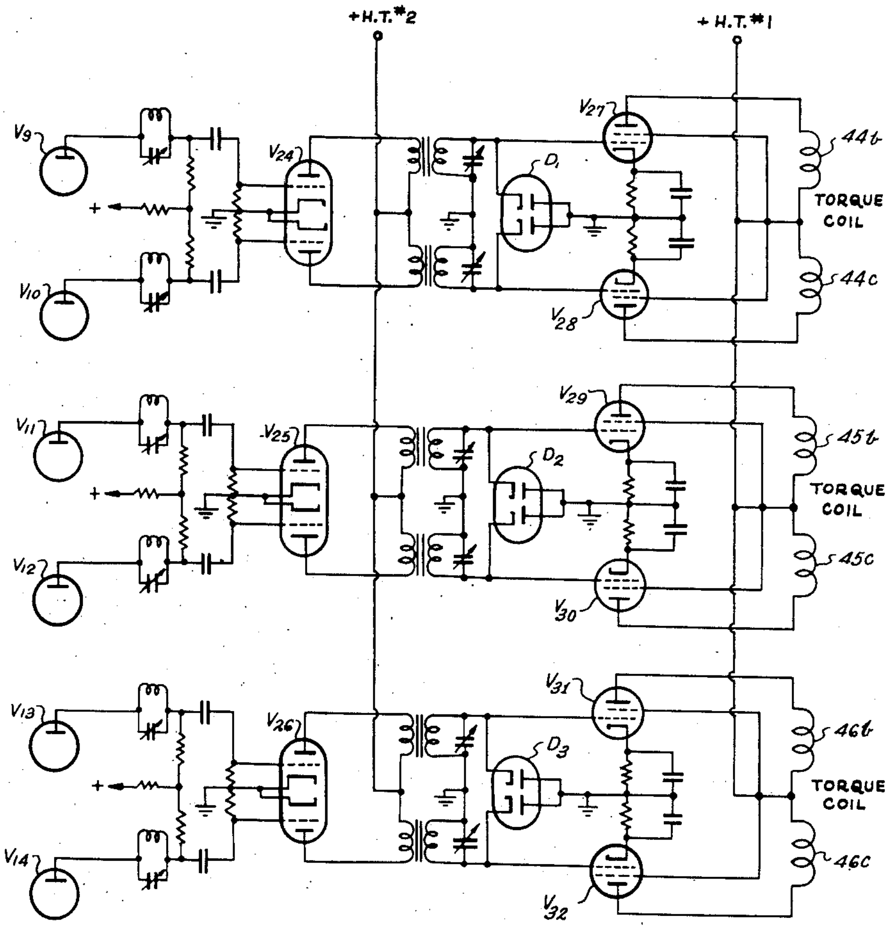
Fig. 18 is a diagram of an alternative terminal circuit for the system of Fig. 17.

Illustrated in Fig. 18 is an alternative output circuit for the mixing tubes V9 thru V14 of Fig. 17 in which reverse of current thru the forcing coils may be more expeditiously controlled. Accordingly, in Fig. 18 the output of the mixer tubes may be fed into the control grid of double amplifying tubes V24 thru V26 so that the sum and difference frequencies from the mixer tubes are separately amplified. The output from these amplifiers V24 thru V26 is delivered to double rectifier tubes D1, D2 and D3 so that only the positive half of either frequency will be transmitted. The output of the rectifiers accordingly is transmitted to the control grids of amplifier tubes V27 thru V32 and the plate of each of these tubes is connected in opposite phase to separate torque or forcing coil. These coils 44*b*, 44*c*, 45*b*, 45*c*, 46*b* and 46*c* may be wound one on the other or otherwise closely disposed toward each other so as to react on the forcing motor by the opposite phase according to which of the tubes are conducting.

*Skewed axis gyro assembly*

Figures 20, 21:
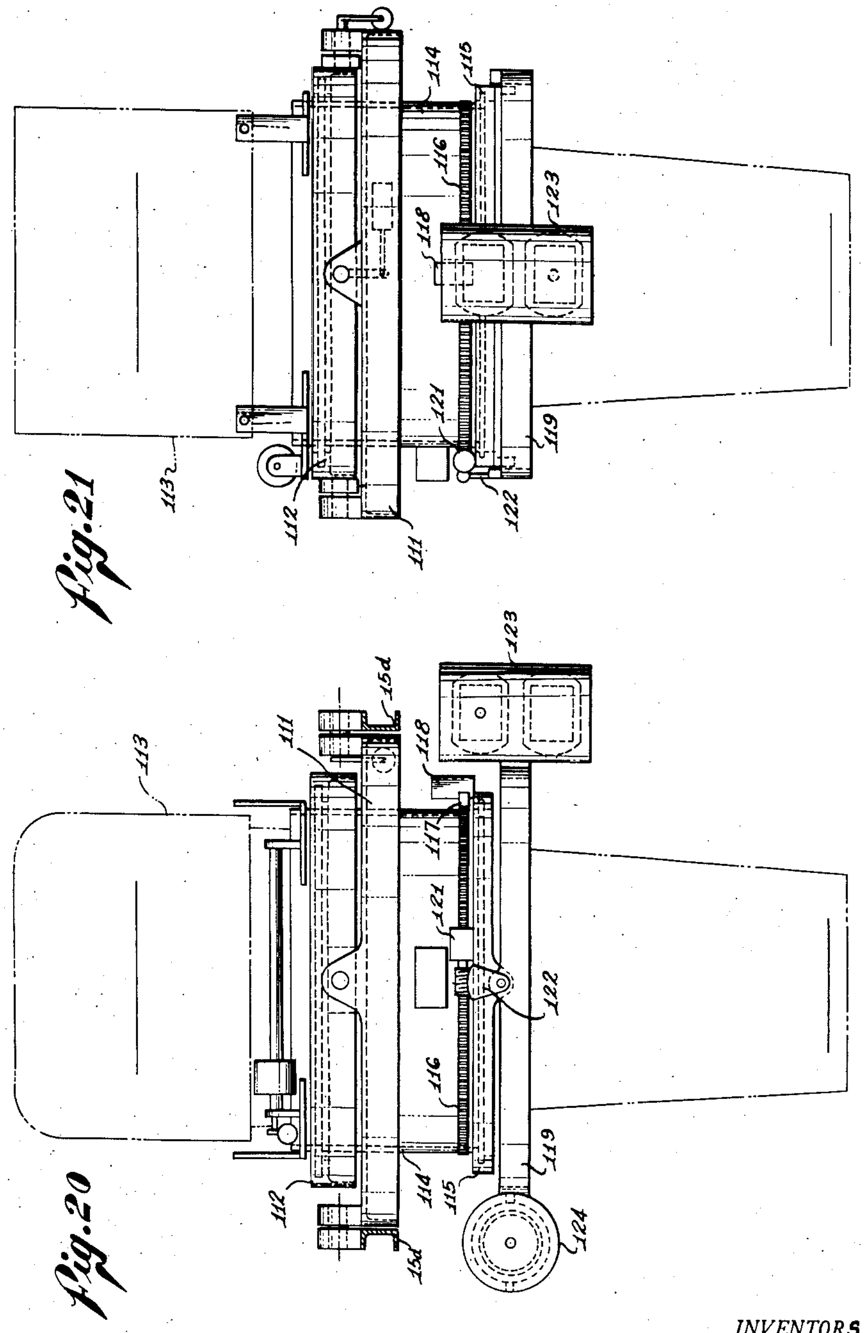
Figs. 20 and 21 are front and side elevation views of a skewed axis gyro mount embodying the invention.

Illustrated in Figs. 20 and 21 is a modification wherein all of the driving gyros are attached to a frame that is tiltable with respect to the camera mounted in the orthogonal mount of the invention. In this gyrostabilization arrangement only one gyro need to be forcibly precessed.

The tilt of the frame gives the desired angular movement about two of the axes when the precession of the third gyro is forced. Thus, the actual control circuit may be simplified by driving only one gyro and by having only one angular rate comparison.

An airplane **15*d* may support an outer ring gimbal 111 on which is mounted an inner ring gimbal 112 and on which a camera 113 is mounted for rotation about its optical axis. Connected to the camera may be cylindrical shell 114 having a rotatable rim 115 supported at the bottom edge thereof and having a ring gear 116 rigidly connected thereto. The ring 115 may be driven to any rotational position by a drive gear 117 receiving its drive from a box 118. A gimbal 119 may be pivoted to the ring 115 and its angular position may be determined by worm gear drive 121 acting on a gear sector 122. If desired a second gimbal may be pivoted to this gimbal 119 but in the illustrated embodiment the gyros are attached directly to the gimbal 119. Accordingly a gyro box 123 may house the gyros which are immovable with respect to the gimbal ring 119. A gyro 124** may be secured to the ring and this gyro may have its precession forced by the usual forcing motors.

In operation the device of Figs. 20 and 21 may be positioned so that the camera will take in the desired field of view. The camera mount gimbals may thereupon be caged where locked and the skew ring 119 may be disposed at an appropriate pre-calculated angle with respect to the camera. When this is completed the gimbals for the camera mount may be engaged and the camera will then be ready for use. Only one gyro, gyro 124, need be operated upon to force its precession.

*Additional features*

The foregoing treatment of the invention has dealt primarily with the most important dynamic and control factors. However, others should be considered for inclusion.

A pendulous vertical reference gyro should be provided, that is, attached to the camera. The purpose of this reference gyro is to furnish an instantaneous indication of ground perpendicular. The camera accordingly may be stablized with respect to this reference during turning flight of the airplane. This gyro determines a dynamic vertical so that in between photographic exposure cycles the camera tends to follow the airplane. In effect it ties the camera position to the airframe except while pictures are being taken.

The pendulous gyro is necessary for long photographic runs so that the photography may be accurate and the gyros corrected regardless of travel over the earth's surface and travel over large periods of time. This gyro accordingly is a control factor which may be introduced into a control circuit.

A mechanism for registering fiducial marks should be incorporated as part of the camera mechanism to enable the matching of successive pictures.

An automatic compensator for weight distribution may be included in addition to the manual compensators illustrated. This restores the center of gravity of the camera to the proper point with respect to the camera mount. This lack of unbalance will be indicated by the gyros failing to come back to their neutral or home position. The homing potentiometer of Fig. 19 accordingly may be used to drive the automatic compensator.

While the invention has been described with respect to specific embodiments thereof, it is not limited to these embodiments since it is intended to cover herein all such modifications as fall within the true spirit and scope of the invention.

We claim:

1. A camera control system for use on a vehicle comprising: a double gimbals mount wherein one gimbal axis is aligned with the normal direction of motion of the vehicle; a rotatable camera support secured to the inner gimbals so that a camera is freely rotatable about its optical axis thereon; a first gyro dynamically secured to said camera support; second and third gyros dynamically secured to each gimbal respectively; a forcing motor associated with each gyro; and a source of power connected with each forcing motor; and a control establishing the relative and absolute amounts of power to each forcing motor for simultaneous operation of all three motors.

2. The method of compensating for image motion in a camera in oblique angle photography comprising; rotating said camera in a plane parallel to the image motion to maintain the optical axis substantially on an object in the scene photographed, and simultaneously rotating said camera substantially about its optical axis to substantially maintain an object in closest part of the foreground at the same point of the image plane of the camera.

3. The method of compensating for image motion in a focal plane shutter camera in oblique angle photography comprising: rotating said camera in a plane parallel to the optical axis of the camera and the direction of the uncompensated image motion at a speed to maintain the optical axis substantially on an object in the scene photographed; simultaneously rotating said camera substantially about its optical axis at an angular velocity to substantially maintain an object in the closest part of the foreground at the same point of the image plane; and simultaneously rotating said camera in a vertical plane by an amount to counteract the drop of the image due to the rotation about the optical axis.

4. In an image motion compensation system for oblique photography, the method of regulating the motion of a camera mounted in free-free gimbals and mounted for rotation about its optical axis comprising: rotating the camera on each axis simultaneously but at separate relative angular velocities dependent upon the oblique angle of photography; and regulating the absolute value of the angular velocities as a function of $V/h$.

5. A camera system for effecting image motion compensation by bodily moving a camera having an optical axis comprising: a mechanical suspension mount having a movable part permitting support of a camera for rotation about orthogonal axes of which one axis may be generally aligned with the camera axis; three primary gyros secured to the movable part of the mount, one for each axis and each including a rotor having an axis at right angles to one of the orthogonal axes and a rotor support rotatable about an axis transverse to its rotor axis; a motor for each support mounted on the movable part for forcing precession of the gyro rotors by forcing rotation of the support; a rate gyro for each primary gyro and reflecting the rate of reaction of said mount to forced precession of the associated primary gyro; means for sensing the response of the rate gyro; a control for each forcing motor; and a regulator for each control and responsive to the rate sending means whereby uniform angular motion of the movable part of the mount is obtained in the reaction to the forced precession of the various gyros and at the level set by the control.

6. A camera system for effecting image motion compensation by bodily moving a camera having an optical axis as defined in claim 5 wherein there are two intersecting axes about which a camera may be rotated, one of which may be generally aligned with the camera axis.

7. A camera system for effecting image motion compensation by bodily moving a camera having an optical axis comprising: a mechanical suspension mount having a movable part permitting support of a camera for rotation about orthogonal axes of which one axis may be generally aligned with the camera axis; three primary gyros secured to the movable part of the mount, one for each axis and each including a rotor having an axis at right angles to the orthogonal axes and a rotor support rotatable about an axis transverse to its rotor axis; a motor for each support mounted on the movable part for forcing precession of the gyro rotors by forcing rotation of the support; a rate of reaction senser associated with each primary gyro; a control for each forcing motor; and a regulator for each control responsive to the rate senser whereby uniform angular motion of the movable part of the mount is obtained in the reaction to the forced precession of the various gyros and at the level set by the control.

8. A camera control system comprising: a mount for a camera permitting free movement of the camera about at least one axis; at least one gyroscope support mounted rigidly with respect to the camera mount except that it is free to precess about an axis transverse to the mount axis; a rotor disposed in the support and having a spin axis transverse to the mount axis; a torque motor for applying a precessing torque to the gyroscope and reacting against said camera mount; and means for selectively energizing the motor.

9. A control system as defined in claim 8 wherein there are two intersecting mount movement axes, two gyroscopes, two different precession axes, and two precessing motors.

10. A control system as defined in claim 8 wherein there are three orthogonal mount movement axes, three gyroscopes, three different precession axes, and three precessing motors, and one of the orthogonal axes is parallel to the camera axis.

11. A camera control system as set forth in claim 10 for use in oblique angle photography from an air vehicle traveling at velocity V and height $h$ from the terrain being photographed wherein the control establishing the relative and absolute amounts of power to each torque motor includes: an oscillator for each axis whose frequency is responsive to angular velocity about that axis; a potential responsive to $V/h$; a potential responsive to crab angle; a reference oscillator; mixing tubes for the rate oscillators and the reference frequency, means for effecting the mixing output amplitude in response to $V/h$ and crab angle potential; a pair of tuned circuits for each mixing tube, one for accepting the sum frequency and the other for accepting the difference frequency; opposed forcing coil windings in each torque motor; and means for directing current to each winding in a direct ratio to the amplitude of the accepted signal.

12. A control system as defined in claim 8 wherein there are at least two gyros, only one of which is free to precess.

13. A camera control system for image motion compensation comprising: a camera mount having a camera engaging portion and rotatable about an axis tranverse to the optical axis of the camera mounted therein; a single gimbal mounted on the camera mount and having its trunnion axis transverse to the mount rotation axis; a gyro rotor mounted in the gimbal and having a spin axis transverse to gimbal trunnion axis and transverse to the camera mount rotation axis; a motor connected to the gyro gimbal and the camera mount to apply a torque between them; and means for controlling said motor.

14. A camera mount for image motion compensation comprising: a universal joint mountable on an airframe; a camera support bracket secured to the universal joint; at least two single gimbals mounted on the bracket with trunnion axes at right angles to each other; a gyro rotor mounted for rotation in each single gimbal; and a motor mounted on the bracket for each single gimbal and connected to the single gimbal to apply a torque about the respective trunnion axis, whereby the reaction to the torque causes rotation of the camera bracket about the universal joint.

15. A twin mount for aerial cameras comprising: a spindle having its central portion apertured; means for mounting the spindle for rotation in an airframe; a cruciform member disposed in the spindle aperture and pivoted to the spindle and having opposite ends projecting therefrom; a housing pivoted to the projecting ends of the cruciform member and surrounding the spindle and having camera engaging brackets; at least one single gyro gimbal mounted on the housing; a gyro rotor in each gimbal; and a forcing motor for each gimbal for applying a torque between the housing and the gyro gimbal, whereby the reaction of the housing to the torque will rotate the housing.

16. A camera control system as set forth in claim 13 wherein the camera mount is rotatable about a pair of axes transverse to the optical axis; there is a pair of gimbals mounted on the camera mount each having a trunnion axis transverse to the other; a gyro rotor is provided for each gimbal; and a motor is provided for each gimbal to apply a torque between the mount and each gimbal; and there is a controlling means for each motor.

17. A camera control system as set forth in claim 13 wherein the mount is rotatable about orthogonal axes, one of which coincides with the camera optical axis; wherein a gyro gimbal is mounted on the mount for each orthogonal axis and each having its trunnion axis at right angles to its associated orthogonal axis; wherein a gyro rotor is in each gyro gimbal and each having a spin axis transverse to the respective trunnion axis; wherein a motor for each gimbal is provided to apply a torque between the gimbal and the mount; and wherein there is a separate means for controlling each motor.

References Cited in the file of this patent

UNITED STATES PATENTS

| | | |
|---|---|---|
| 1,586,070 | Cook | May 25, 1926 |
| 1,953,304 | Lutz | Apr. 3, 1934 |
| 2,210,090 | Lutz et al. | Aug. 6, 1940 |
| 2,273,876 | Lutz et al. | Feb. 24, 1942 |
| 2,293,039 | Esval | Aug. 18, 1942 |
| 2,405,052 | Poitras et al. | July 30, 1946 |
| 2,408,356 | Willard | Sept. 24, 1946 |
| 2,439,381 | Darlington et al. | Apr. 13, 1948 |

FOREIGN PATENTS

| | | |
|---|---|---|
| 516,185 | Great Britain | Dec. 27, 1933 |